(12) United States Patent
Andersson

(10) Patent No.: US 10,855,145 B2
(45) Date of Patent: Dec. 1, 2020

(54) TRACK-BOUND VEHICLE ELECTRIC MACHINE

(71) Applicant: Bombardier Transportation GmbH, Berlin (DE)

(72) Inventor: Svante Andersson, Västerås (SE)

(73) Assignee: Bombardier Transportation GmbH, Berlin (DE)

( * ) Notice: Subject to any disclaimer, the term of this patent is extended or adjusted under 35 U.S.C. 154(b) by 213 days.

(21) Appl. No.: 16/099,365

(22) PCT Filed: Apr. 19, 2017

(86) PCT No.: PCT/EP2017/059264
§ 371 (c)(1),
(2) Date: Nov. 6, 2018

(87) PCT Pub. No.: WO2017/194279
PCT Pub. Date: Nov. 16, 2017

(65) Prior Publication Data
US 2019/0214888 A1    Jul. 11, 2019

(30) Foreign Application Priority Data

May 11, 2016 (SE) ...................... 1650633

(51) Int. Cl.
*H02K 9/24*      (2006.01)
*H02K 5/20*      (2006.01)
(Continued)

(52) U.S. Cl.
CPC ................ *H02K 9/24* (2013.01); *B60L 13/03* (2013.01); *B61C 3/00* (2013.01); *H02K 5/20* (2013.01);
(Continued)

(58) Field of Classification Search
CPC ........ H02K 2205/09; H02K 5/20; H02K 9/06; H02K 9/24
See application file for complete search history.

(56) References Cited

U.S. PATENT DOCUMENTS

2005/0286225 A1   12/2005   Moore et al.
2013/0342044 A1   12/2013   Vallinayagam et al.
(Continued)

FOREIGN PATENT DOCUMENTS

CN      201035423 Y      3/2008
CN      103900180 A      7/2014
(Continued)

*Primary Examiner* — Ramon M Barrera
(74) *Attorney, Agent, or Firm* — Dilworth & Barrese, LLP

(57) ABSTRACT

An electric machine with a rotor (4) rotatably disposed within a stator (1) with a stator winding (3) has a plurality of permanent magnets (8) received therein. A casing (17) encloses the stator and the rotor, and an impeller (13) with blades is fixed to an axle (7) of the rotor so as to generate a flow of air through the casing for cooling end-turns (25) of the stator winding by drawing air through an inlet opening (18) at one end of the casing and blowing it out of the casing through an outlet opening (19) at the other end of the casing. At least one shutter is arranged to close the outlet opening (19) when the temperature of the cooling air through the outlet opening reaches a predetermined level well above a maximum level of the temperature possible to be reached under normal operation of the electric machine so as to close the outlet opening upon occurrence of arcing in the end-turns. A temperature dependent member is arranged in the air flow through the outlet opening to obtain such closing.

20 Claims, 8 Drawing Sheets

(51) Int. Cl.
*H02K 9/06* (2006.01)
*H02K 11/26* (2016.01)
*B60L 13/03* (2006.01)
*B61C 3/00* (2006.01)
*H02K 5/22* (2006.01)
*H02K 7/00* (2006.01)

(52) U.S. Cl.
CPC ............. *H02K 5/225* (2013.01); *H02K 7/006* (2013.01); *H02K 9/06* (2013.01); *H02K 11/26* (2016.01); *H02K 2205/09* (2013.01); *H02K 2213/09* (2013.01)

(56) References Cited

U.S. PATENT DOCUMENTS

| | | |
|---|---|---|
| 2015/0000549 A1 | 1/2015 | Nagayama et al. |
| 2015/0062371 A1 | 3/2015 | Togita |

FOREIGN PATENT DOCUMENTS

| | | |
|---|---|---|
| CN | 204497889 U | 7/2015 |
| EP | 2264859 B1 | 12/2010 |
| EP | 2602917 A1 | 6/2013 |
| FR | 1018863 A | 1/1953 |

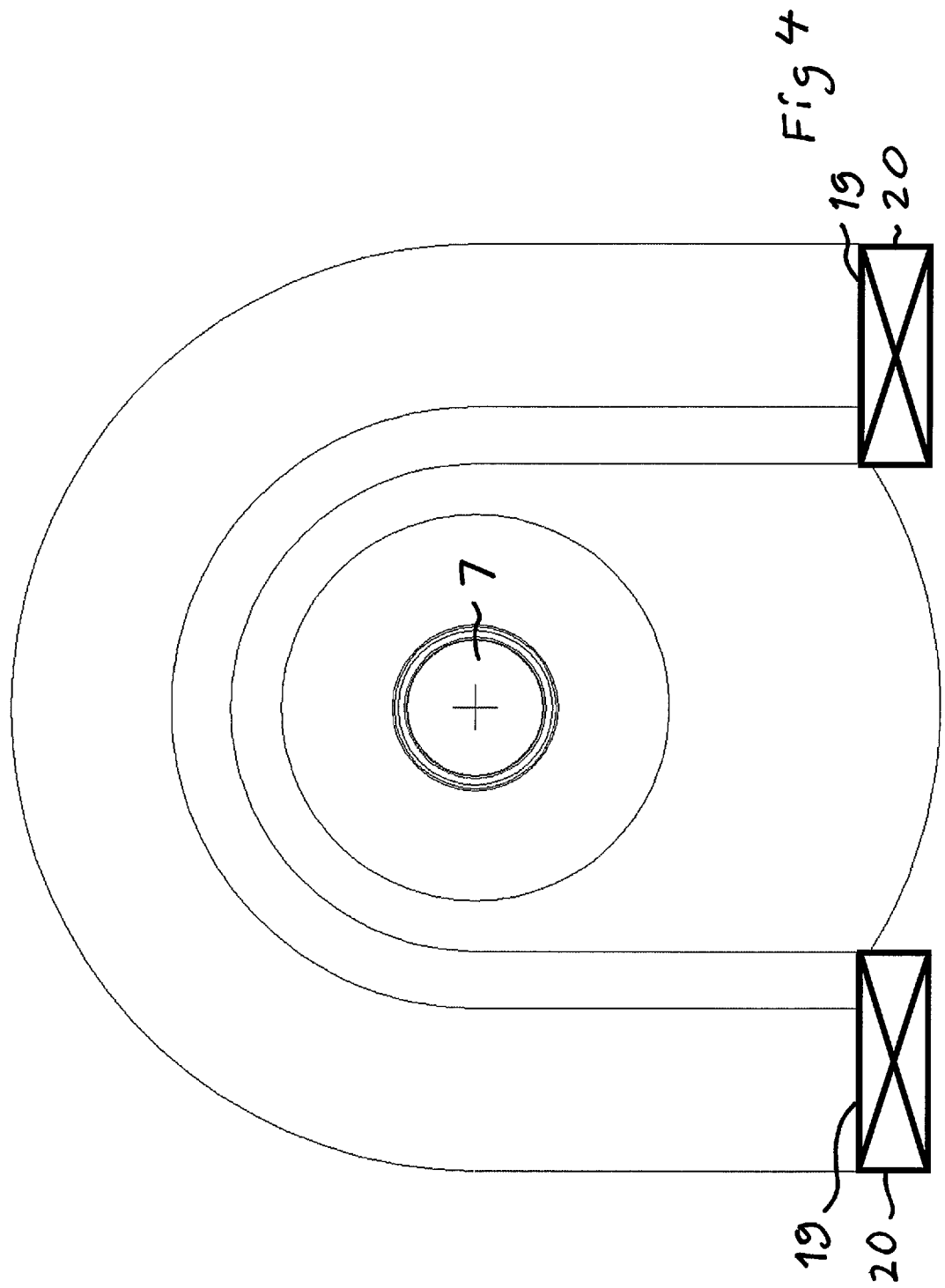

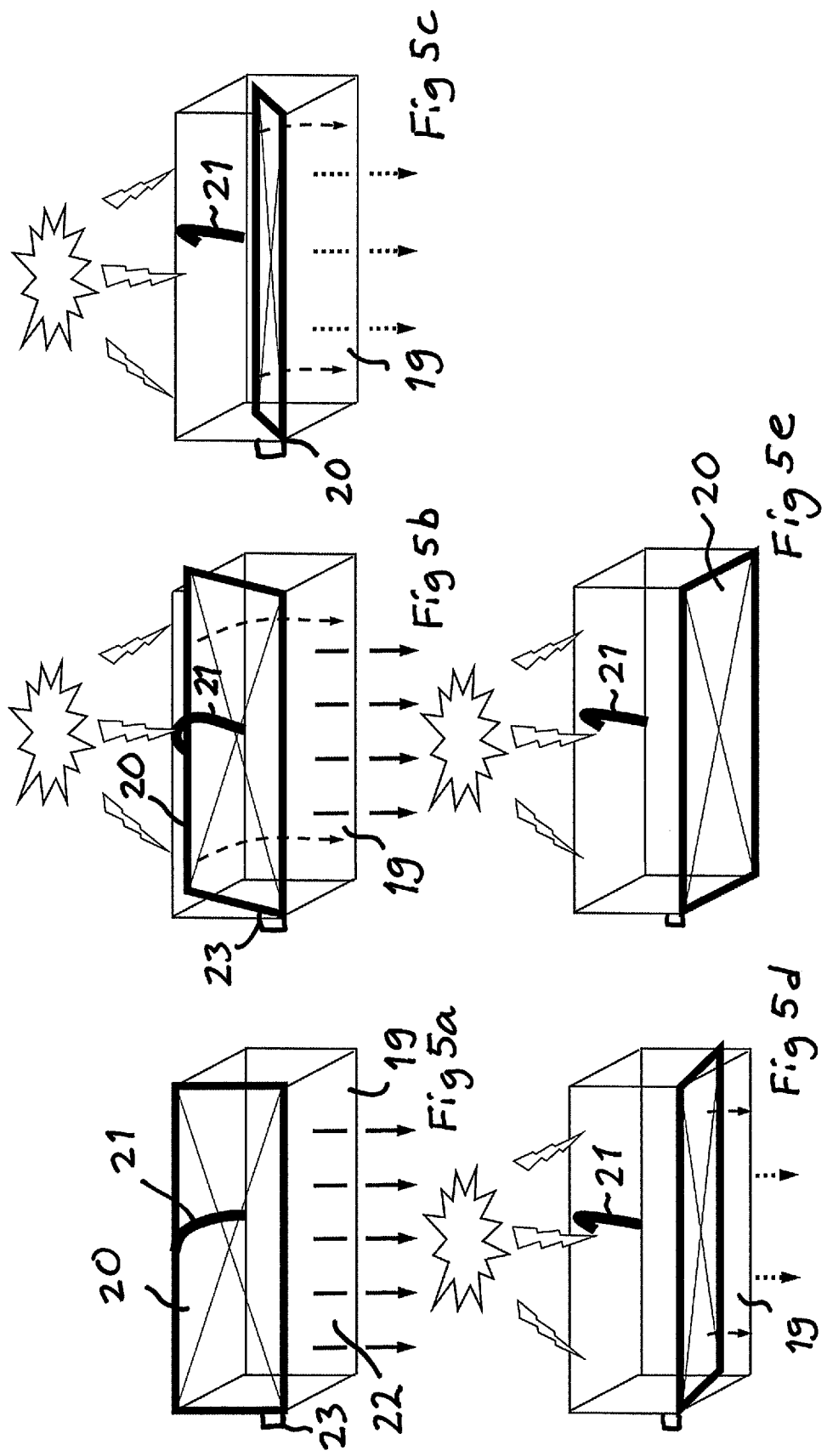

TRACK-BOUND VEHICLE ELECTRIC MACHINE

TECHNICAL FIELD OF THE INVENTION AND BACKGROUND ART

The present invention relates to a track-bound vehicle electric machine configured to act as a motor for creating a traction force of a track-bound vehicle and comprising:
- a stator having a stator body with a stator winding wound therearound and configured to electrically create a plurality of stator poles disposed around the inner periphery of the stator body,
- means configured to connect the stator winding to an AC source or receiver,
- a rotor rotatably disposed within said stator and having a rotor body with a plurality of permanent magnets received therein,
- a casing enclosing the stator and the rotor, and
- an impeller with blades fixed to an axle of the rotor at one end of the stator body so as to generate a flow of air substantially axially with respect to an axis of rotation of the rotor towards the other end of the stator body for cooling end turns of the stator windings by drawing air through an inlet opening at one end of the casing and blowing it out of the casing through an outlet opening at the other end of the casing.

Such an electric machine may of course also operate as a generator when braking the vehicle, although this disclosure will focus mainly on the operation thereof as a motor for which a high torque capability with respect to a determined size of the motor is an important feature and is offered by this type of electric machine. By using a plurality of permanent magnets to produce the magnetic flux of the rotor a synchronous motor called permanent magnet synchronous motor is achieved, and such a motor has lower rotor losses compared to an induction motor and thus higher efficiency. It can also be built with a higher pole number, compared to an induction motor, without sacrificing performance, so that it can have a higher torque capability aimed at.

The efficiency of cooling such an electric machine determines the maximum power of operation when such an electric machine functions as a motor, and an electric machine of the type defined in the introduction is called semi-open self-ventilated permanent magnet motor and has generally higher performance than closed self-ventilated permanent magnet motors due to the fact that the cooling of the end-turns of the stator winding is better, so that the semi-open motor can have a higher thermal load. Arcing in the end-turns of the stator winding may for different reasons appear in such an electric machine, such as a consequence of a poor insulation of a joint in the winding, an inferior contact in the winding etc. Such an arc may raise the temperature of the air passing the end-turns up to 1 400° C. or even higher and be extended by the air flow thus melting the copper of the stator winding and also other steel parts of the motor for instance a grating that may be present in the outlet opening of the casing for preventing anyone to touch into the casing.

No matter how the air outlet opening of the casing is directed, the occurrence of such arcing will still cause great problems. The outlet opening is normally directed downward towards the rail track in order to avoid molten copper, steel and flames to be blown onto the gearbox or other components in the bogie of the vehicle during arcing in the stator winding. However, even though it is better to blow molten copper and steel down towards the rail track instead of onto the gearbox or other components in the bogie in case of arcing in the electric machine, the authorities responsible for track safety are reluctant to accept the fact that in case of a failure, molten copper may end up on safety related equipment on or near a rail track.

A possibility to reduce this problem would be to brake the vehicle to lower speed as soon as an arc is detected to remove the voltage sustaining the arc, but that would cause delays and if the vehicle is in a tunnel, this may not even be allowed until the vehicle is out of the tunnel. Thus, there may be substantial damage to the stator winding and a large portion of the winding may be melted and blown out of the motor then.

SUMMARY OF THE INVENTION

The object of the present invention is to provide a track-bound vehicle electric machine of the type defined in the introduction being improved with respect to known such electric machines by the way of addressing the problem discussed above.

This object is according to the invention obtained by providing such a track-bound vehicle electric machine with the features herein.

By the arrangement of said at least one shutter in the outlet opening of the casing and an arrangement with the temperature dependent member arranged in the air flow through the outlet opening with the features defined in claim 1, the shutter will close the outlet opening upon occurrence of arcing so that no air, flames or molten material can exit the outlet opening. Furthermore, when the shutter is in the closed position there will be no air flow in the electric machine, so that there will be much less heat transferred from the arc to the air outlet opening and the shutter, which will reduce the requirement for the shutter to withstand heat.

According to an embodiment of the invention said at least one shutter is configured to close said outlet opening of the casing completely or by at least 90% in said second closed position, which will principally reduce any flames or molten material exiting the air outlet opening of the electric machine upon occurrence of arcing to zero.

According to another embodiment of the invention said temperature dependent member is configured to irreversibly transfer said at least one shutter to said second closed position upon an increase of the temperature of the air flow through said outlet opening above said predetermined level. It is preferred that it is impossible to return the shutter to the open position, since the electric machine may after occurrence of arcing anyway be taken out of service for repair.

According to another embodiment of the invention said predetermined level is 200K-1000K above said maximum level of the temperature possible to be reached by said air flow under normal operation of the electric machine. By having said predetermined level within this interval it is impossible that the temperature of the outlet air from the electric machine reaches said predetermined level without occurrence of arcing irrespectively of the ambient temperature and the operation load of the machine, but the temperature will reach said predetermined level as soon as arcing occurs.

According to another embodiment of the invention said maximum level of the temperature possible to be reached by said air flow under normal operation of the electric machine is 60° C.-130° C., 80° C.-120° C. or approximately 100° C. These are typical maximum levels of the temperature possible to be reached by track-bound vehicle electric machines of the type defined in the introduction.

According to another embodiment of the invention said arrangement comprises means configured to urge said at least one shutter towards said second closed position, and said temperature dependent member is configured to prevent said means to move said shutter from said first open position as long as said temperature of said cooling air is below said predetermined level. The existence of such means in said arrangement enables a reliable and fast transfer of said at least one shutter to said second closed position when the temperature of the air flow through the outlet opening passes said predetermined level.

According to another embodiment of the invention said temperature dependent member comprises a bar of a material losing its mechanical strength at a temperature above said predetermined level. Thus, a temperature dependent member in the form of said bar may then be arranged so that it has to have a certain mechanical strength in order to hold said at least one shutter in the first open position and prevent it from being transferred to said second closed position.

According to another embodiment of the invention said temperature dependent member comprises a bimetallic strip causing said transfer by temperature dependent prolongation. This constitutes another possible way of realizing a said temperature dependent member with a reliable function.

According to another embodiment of the invention said temperature dependent member comprises a portion of a substance reacting chemically upon a temperature thereof reaching said predetermined level and by that causing transfer of said at least one shutter to said second closed position. According to further developments of this embodiment said substance is an explosive material or a substance rapidly increasing its volume when reaching a temperature of said predetermined level, so that said at least one shutter may then be influenced towards the second closed position thereof.

According to another embodiment of the invention said substance is configured to, when reaching a temperature of said predetermined level operating said at least one shutter from a distance by means of a mechanical means, such as a rod or wire, or by means of pressure or flow through a pipe.

According to another embodiment of the invention the electric machine comprises a plurality of said shutters configured to together close said outlet opening of the casing in said second closed position. Such a solution may for structural reasons sometimes be preferred.

According to another embodiment of the invention the electric machine includes shutters which are interconnected by a member, such as a rod, and said temperature dependent member is configured to cause this interconnecting member to transfer all of these shutters into said second position upon an increase of the temperature of the air flow through said outlet opening above said predetermined level This constitutes a simple and efficient way of achieving a reliable closing of said air outlet opening of the casing in case of occurrence of arcing.

According to another embodiment of the invention said temperature dependent member is configured to transfer said at least one shutter by electricity by being in the form of either an electromechanical actuator or a member for electric heating triggering a chemical reaction or a phase transition or a thermal expansion. And according to a further development of this embodiment the electric machine is provided with one or more sensors configured to sense temperature or electromagnetic radiation and connected to said member transferring said at least one shutter by use of electricity.

The invention also relates to a driving arrangement for a track-bound vehicle comprising an electric machine according to the invention, use of an electric machine according to the invention in a driving arrangement for generating a traction force of a track-bound vehicle as well as a track-bound vehicle having a driving arrangement for generating a traction force of the vehicle including at least one electric machine according to the present invention. The advantageous features and the advantages of such a driving arrangement, use and vehicle appear clearly from the above discussion of the different embodiments of an electric machine according to the present invention.

Further advantages as well as advantageous features of the invention will appear from the following description.

BRIEF DESCRIPTION OF THE DRAWINGS

With reference to the appended drawings, below follows a specific description of embodiments of the invention cited as examples.

FIG. 4 is a view of the electric machine shown in FIG. 3 corresponding to the view of FIG. 2, FIGS. 5a-e are views used to illustrate the construction and function of the parts of an electric machine according to a first embodiment of the invention addressing the arcing problem discussed above.

DETAILED DESCRIPTION OF EMBODIMENTS OF THE INVENTION

Figure 1:
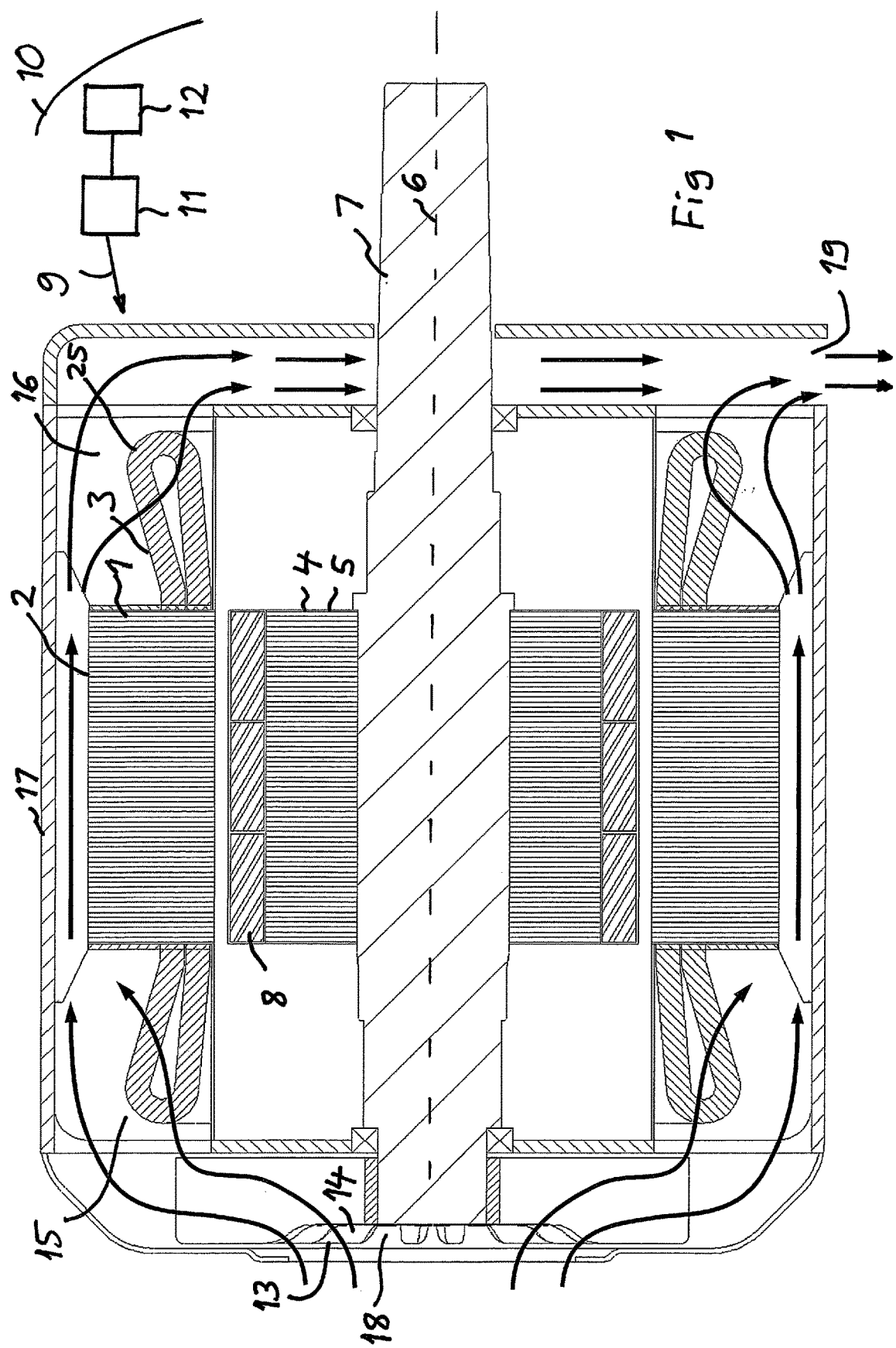
FIG. 1 is a schematic view of an electric machine of the type to which the present invention relates in longitudinal cross-section, in which some features characterizing the present invention has been left out for illustrating purposes.

FIG. 1 shows schematically the main parts of a track-bound vehicle electric machine of the type to which the present invention relates and which is disclosed more in detail in EP 2 264 860. This electric machine has a stator 1 with a stator body 2 with a stator winding 3 wound therearound and configured to electrically create a plurality of stator poles disposed around the inner periphery of the stator body. The stator winding is received in radial slots in the stator body extending over the entire length of this body. The total number of slots and number of slots per pole may be any conceivable, but as an example these number may be 48 and 4.

The electric machine further comprises a rotor 4 with a rotor body 5, which as the stator body is made of a laminated assembly of mutually electrically insulated angular plates of magnetic steel axially stacked with respect to an axis of rotation 6 of the rotor for keeping eddy current losses in these bodies at low levels and the rotor body 4 has magnets 8 mounted on the surface of the rotor and/or magnets mounted in the interior of the rotor. The rotor body 5 is rigidly connected with respect to rotation to a rotor axle 7 which is to be connected to the wheel axle of a vehicle, possibly through a gear box.

It is also indicated how the electric machine has means 9 configured to connect the stator winding 3 to an AC source or receiver, which in the present case is an AC supply line or a diesel driven generator of the vehicle 10 schematically indicated. However, any type of AC source is conceivable, and the alternating current may very well be created by an inverter connected to a direct voltage source on the other side thereof and for instance controlled according to a Pulse Width Modulation pattern. The box 11 in FIG. 1 indicates control equipment for the electric machine, such as a converter, and said AC source is here indicated by the box 12. "AC receiver" refers in this disclosure to the case of an electric machine operating in the generator mode.

The electric machine has means configured to generate a flow of air for cooling parts of the electric machine, and this means includes an impeller 13 with blades 14 fixed to the rotor axle 7 at one end 15 of the stator body so as to generate a flow of air substantially axially with respect to the axis of rotation 6 of the rotor towards the other end 16 of the stator body. A casing 17 encloses the stator and the rotor and has an inlet opening 18 at one end and an outlet opening 19, in fact formed by two opening parts (see FIG. 2) at the other end, so that a flow of cooling air will go from the inlet opening to the outlet opening while passing the stator winding end-turns 25 for cooling thereof. The electric machine is self-ventilated by the fact that rotation of the rotor will cause ventilation of the machine, and the cooling air flow is in this case proportional to the speed of the vehicle 10 in which the electric machine is mounted.

Figure 2:
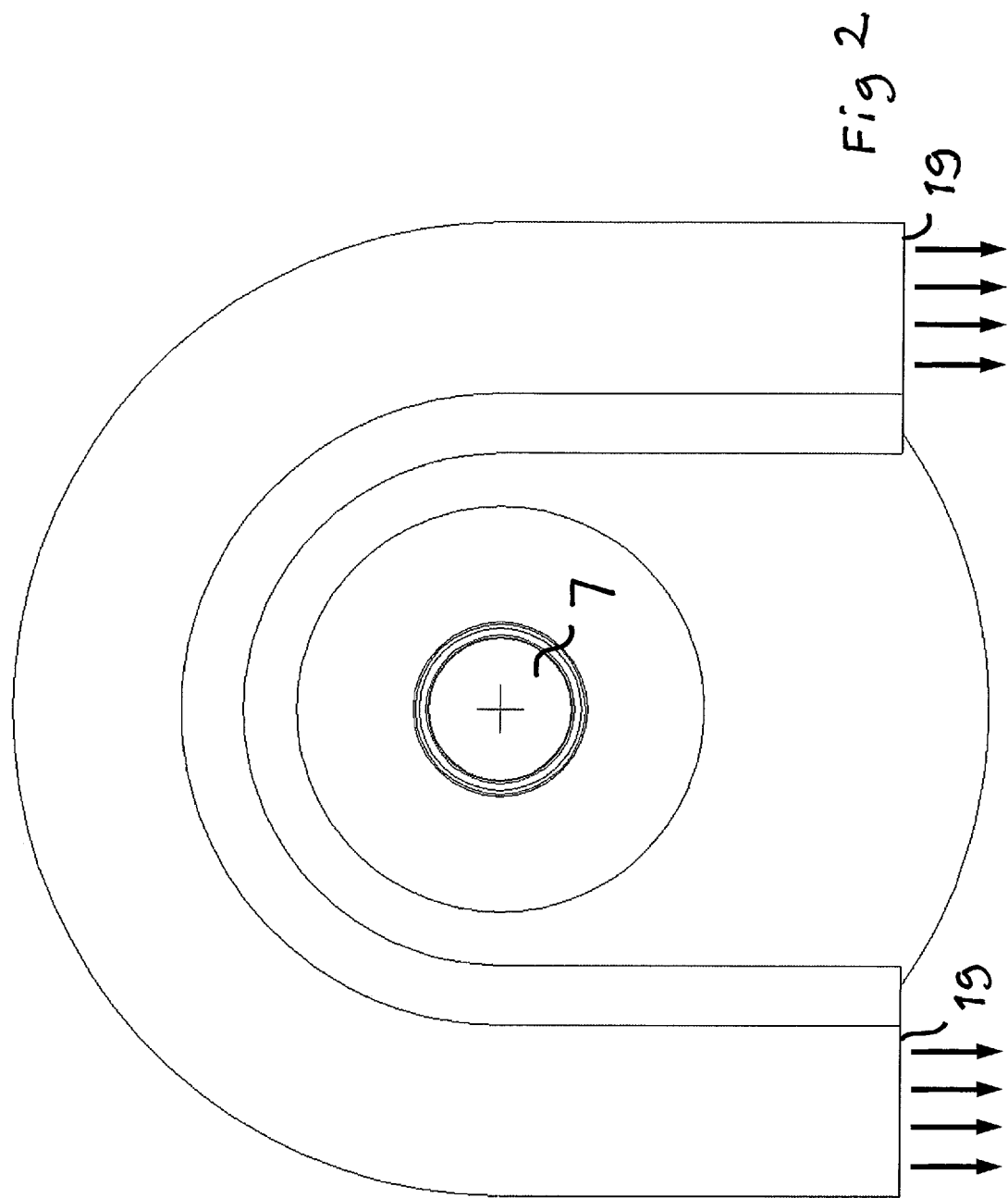
FIG. 2 is a simplified end view of the electric machine from the right in FIG. 1.
Figure 3:
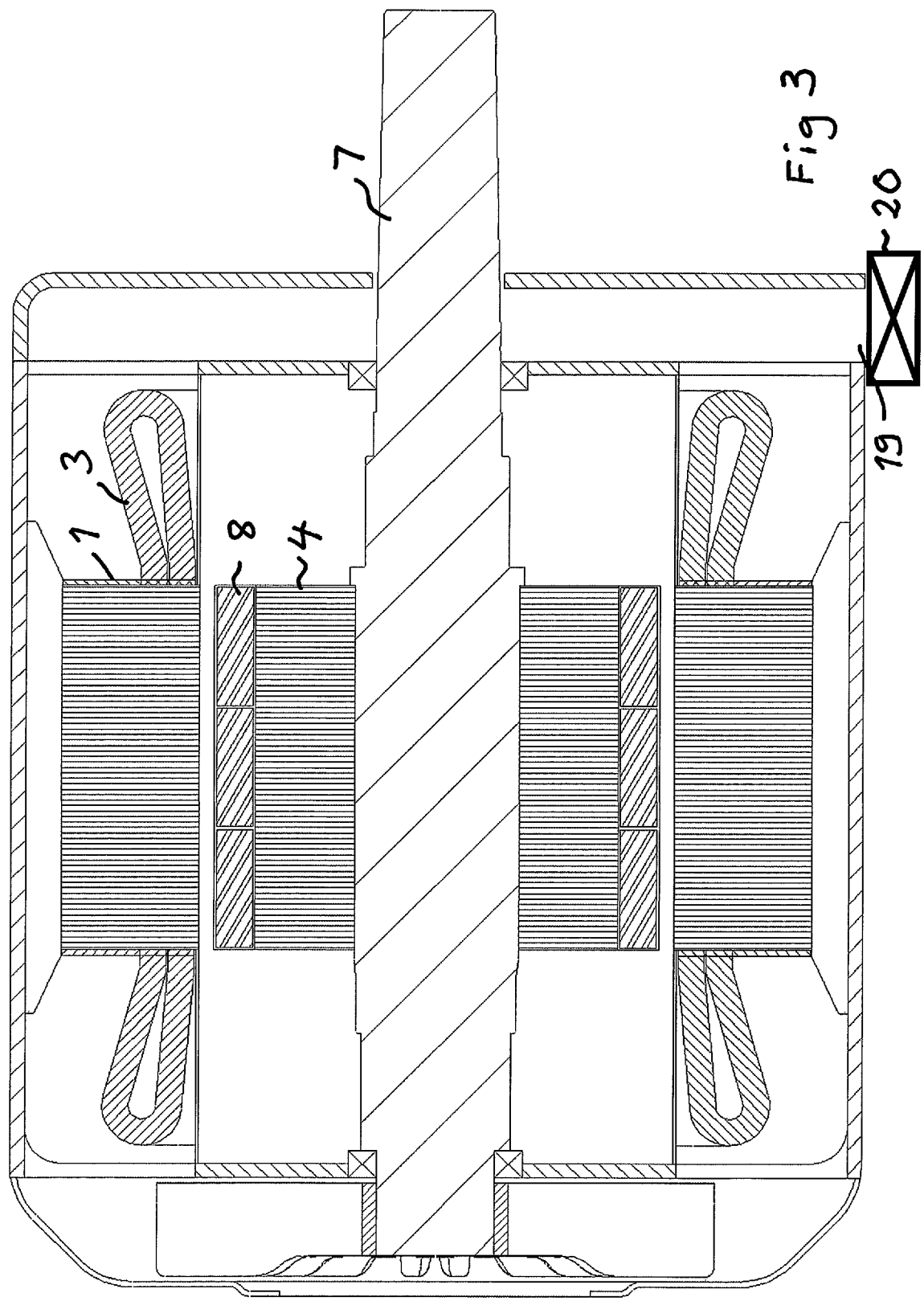
FIG. 3 is a view of an electric machine according to an embodiment of the invention corresponding to FIG. 1.

It is shown in FIG. 2 how the air flow through the electric machine will blow out of the casing downwardly towards a rail track when the vehicle is standing on a rail track. FIGS. 3 and 4 illustrates very schematically how at least one shutter is arranged in each outlet opening part of the casing together with an arrangement making closing of the outlet opening possible, and different embodiments of realizing such shutters and arrangements will now be disclosed while referring to the FIGS. 5-7.

FIG. 5a illustrates the outlet opening 19 of the casing 17 enclosing the rotor and the stator, in fact one of the two openings shown in FIGS. 2 and 4. A shutter 20 is arranged in this outlet opening together with an arrangement having a temperature dependent member 21 in the form of a bar of a material losing its mechanical strength above a certain temperature. This bar 21 is arranged in the air flow 22 through the outlet opening and configured to hold the shutter 20 in a first open position releasing the outlet opening for flow of cooling air to pass it. The arrangement further comprises means 23 schematically indicated configured to springloadly urge the shutter towards a second closed position. The temperature of the air passing through said outlet opening 19 may have a maximum level during normal operation of about 60K above the ambient temperature, which implies a maximum temperature thereof of approximately 100° C. It is then suitable to have the bar 21 made of a material starting to lose its mechanical strength at a temperature of at least 150° C., so that it will reliably hold the shutter 20 in the open position shown in FIG. 5a as long as the electric machine operates normally. However, when arcing in said stator winding occurs as illustrated in FIG. 5b the temperature of said air flow through the outlet opening passing the bar 21 may rapidly increase by in the order of 1000K, so that the material of the bar 21 will lose its mechanical strength and the means 23 will transfer the shutter 20 towards a second closed position closing the outlet opening 19 and stopping the air flow through the casing as illustrated in FIGS. 5b-e.

Figure 6A:
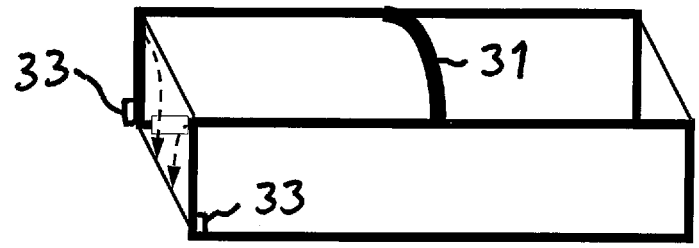
FIG. 6a-b are views corresponding to those of FIG. 5 for an electric machine according to a second embodiment of the invention.
Figure 6B:
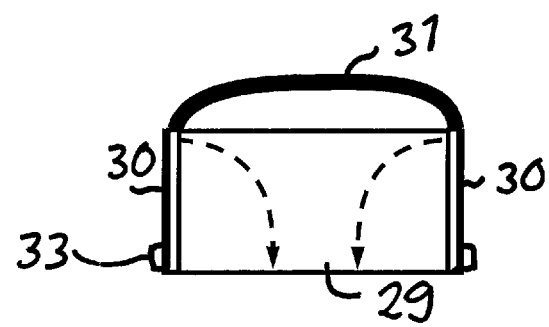

FIG. 6a-b illustrate another possibility to obtain the function just described upon occurrence of arcing. In this case two shutters 30 are arranged so as to in said second closed position together close the outlet opening 29, and these are hold by a temperature dependent member 31 in common in the form of a bar with similar properties to the bar shown in FIGS. 5a-e. Thus, would the temperature of the air flowing through the outlet opening increase as a consequence of arcing the material of the bar 31 will lose its mechanical strength and means 33 will make the shutters to pivot downwards and close the outlet opening 29.

Figure 7A:
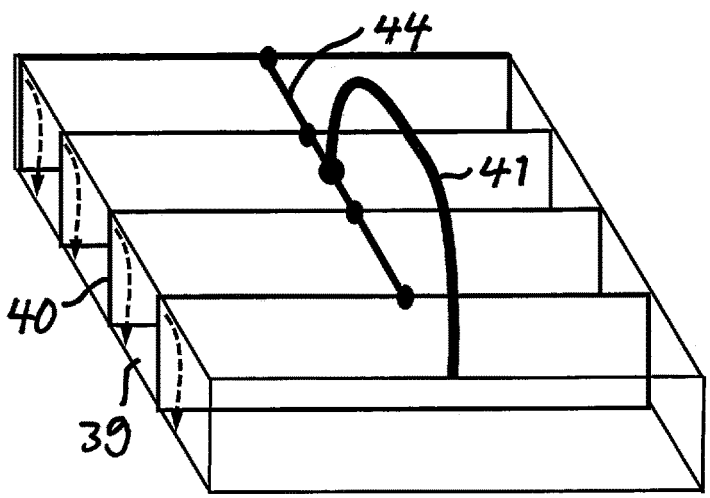
FIG. 7a-c are views corresponding to FIG. 5 for an electric machine according to a third embodiment of the invention.
Figure 7B:
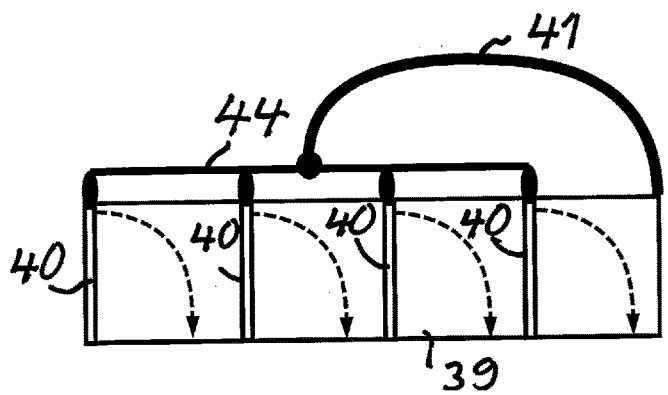
Figure 7C:
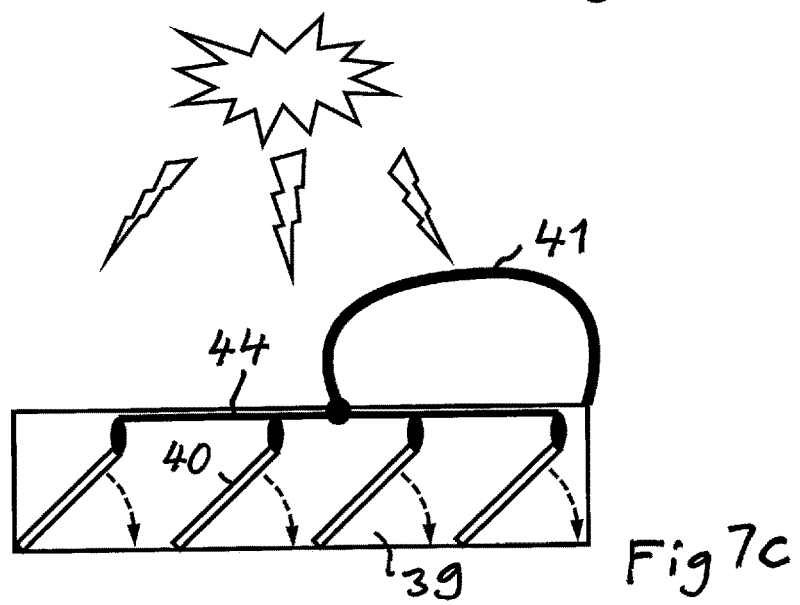

FIGS. 7a-c illustrate the parts corresponding to those shown in FIGS. 5 and 6 of an electric machine according to a third embodiment of the invention having a plurality, in fact 4, shutters 40 arranged in the outlet opening 39. These shutters are configured to together close the outlet opening of the casing in a second closed position. The shutters are interconnected by a member in the form of a rod 44, and a bar 41 of a material losing its mechanical strength above a certain temperature is connected to the rod 44 for holding all shutters in the open position shown in FIGS. 7a and 7b during normal operation of the electric machine. However, would arcing occur, as illustrated in FIG. 7c, the temperature of the air flow through the outlet opening 29 passing the bar 41 will increase above a level resulting in a loss of the mechanical strength of the material of the bar 41, so that the shutters 40 will pivot downwards to said second closed position closing the outlet opening 39 and by that stopping the air flow in the electric machine.

Figure 8:
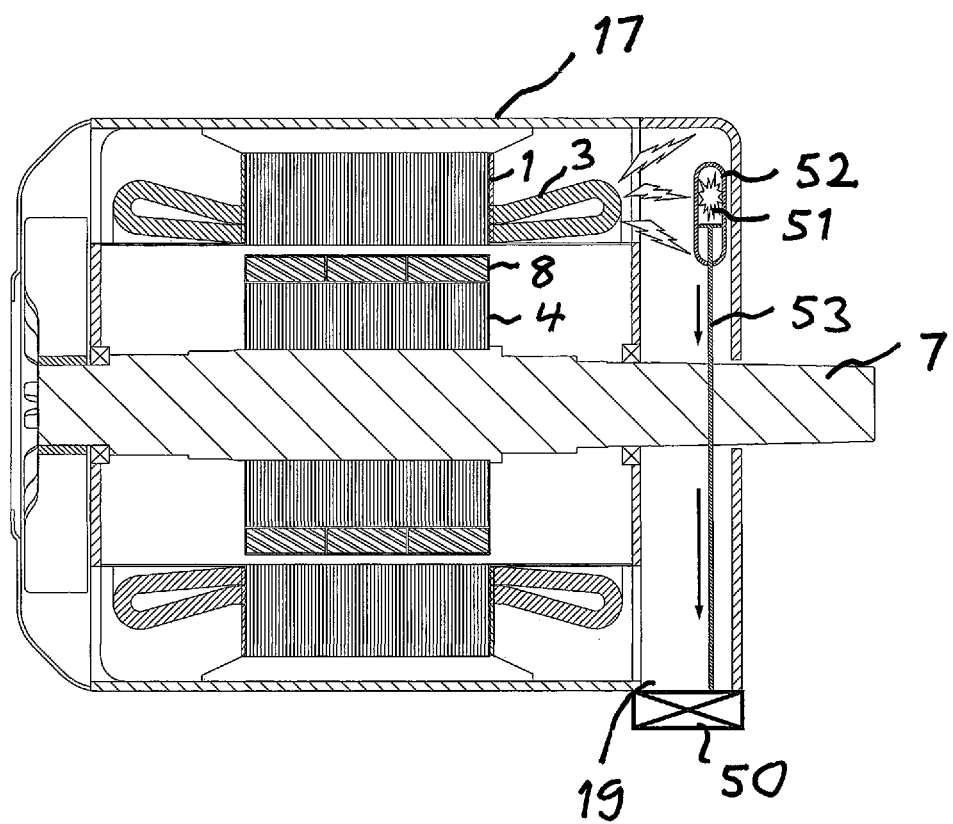
FIG. 8 is a view of an electric machine according to a fourth embodiment of the invention corresponding to FIG. 3.

FIG. 8 illustrates schematically an electric machine according to a fourth embodiment of the invention having a temperature dependent member in the form of a substance 51 enclosed in a housing 52 and increasing its volume through a chemical reaction or a phase transition or thermal expansion when reaching a temperature of said predetermined level then pushing a rod 53 to operate the shutter(s) 50 from a distance to close said outlet opening of the casing 17.

The invention is of course not in any way restricted to the embodiments described above, but many possibilities to modifications thereof will be apparent to a person with ordinary skill in the art without departing from the scope of the invention as defined in the appended claims.

As already disclosed above, the temperature dependent member may have another structure than a bar, such as a bimetallic strip or a substance reacting chemically upon a temperature thereof reaching said predetermined level so as to mention a few possible examples thereof. Means urging the shutter or shutters towards the second closed position may by a suitable construction and arrangement of the shutter or shutters be realized by purely using the gravitation.

The overall appearance of the electric machine may of course differ from that shown in FIG. 1 as long as it is constituted by a semi-open permanent magnet machine with a rotor provided with permanent magnets surrounded by a stator provided with a stator winding.

Furthermore, the orientation of the outlet opening may be any conceivable, although an orientation thereof for directing the air flow downward towards the rail track when the vehicle is standing on a rail track may be preferred for not blowing warm air onto a gearbox or other components during normal operation of the electric machine.

The stator body and the rotor body have not to be laminated.

The invention claimed is:

1. A track-bound vehicle electric machine configured to act as a motor for creating a traction force of a track-bound vehicle (10) and comprising:
a stator (1) having a stator body (2) with a stator winding (3) wound therearound and configured to electrically create a plurality of stator poles disposed around the inner periphery of the stator body,
means (9) configured to connect the stator winding to an AC source or receiver (12),
a rotor (4) rotatably disposed within said stator (1) and having a rotor body (5) with a plurality of permanent magnets (8) received therein,
a casing (17) enclosing the stator and the rotor, and
an impeller (13) with blades (14) fixed to an axle (7) of the rotor at one end (15) of the stator body to generate a flow of air substantially axially with respect to an axis of rotation (6) of the rotor towards the other end (16) of the stator body for cooling end-turns (25) of the stator winding by drawing air through an inlet opening (18) at one end of the casing (17) and blowing it out of the casing through an outlet opening (19, 29, 39) at the other end of the casing,
wherein the machine further comprises at least one shutter (20, 30, 40) arranged in the outlet opening (19, 29, 39) of said casing and an arrangement having a temperature dependent member (21, 31, 41) arranged in the air flow through said outlet opening and configured to hold said at least one shutter in a first open position releasing the outlet opening for flow of cooling air to pass as long as the temperature of said cooling air is below a predetermined level and to cause transfer of said at least one shutter (20, 30, 40) to a second closed position substantially closing said outlet opening (19, 29, 39) of the casing, upon an increase of the temperature of the air flow through said outlet opening above said predetermined level, and
the temperature of said predetermined level is at least 50K above a maximum level of the temperature possible to be reached by said air flow under normal operation of the electric machine.

2. An electric machine according to claim 1, wherein said at least one shutter (20, 30, 40) is configured to close said outlet opening (19, 29, 39) of the casing completely in said second closed position.

3. An electric machine according to claim 1, wherein said temperature dependent member (21, 31, 41) is configured to irreversibly transfer said at least one shutter to said second closed position upon an increase of the temperature of the air flow through said outlet opening (19, 29, 39) above said predetermined level.

4. An electric machine according to claim 1, wherein said predetermined level is 200K-1000K above said maximum level of the temperature possible to be reached by said air flow under normal operation of the electric machine.

5. An electric machine according to claim 1, wherein said maximum level of the temperature possible to be reached by said air flow under normal operation of the electric machine is 60° C.-130° C., 80° C.-120° C. or approximately 100° C.

6. An electric machine according to claim 1, wherein said arrangement comprises means (23, 33) configured to urge said at least one shutter (20, 30) towards said second closed position, and said temperature dependent member (21, 31) is configured to prevent said means to move said shutter from said first open position as long as said temperature of said cooling air is below said predetermined level.

7. An electric machine according to claim 1, wherein said temperature dependent member (21, 31, 41) comprises a bar of a material losing its mechanical strength at a temperature above said predetermined level.

8. An electric machine according to claim 1, wherein said temperature dependent member comprises a bimetallic strip causing said transfer by temperature dependent prolongation.

9. An electric machine according to claim 1, wherein said temperature dependent member comprises a portion of a substance reacting chemically upon a temperature thereof reaching said predetermined level and causing transfer of said at least one shutter (20, 30, 40) to said second closed position.

10. An electric machine according to claim 9, wherein said substance is an explosive material or a substance rapidly increasing its volume when reaching a temperature of said predetermined level.

11. An electric machine according to claim 9, wherein said substance (51) is configured to, when reaching a temperature of said predetermined level operating said at least one shutter (50) from a distance by mechanical means (53), such as a rod or wire, or pressure or flow through a pipe.

12. An electric machine according to claim 1, comprising a plurality of said shutters (30, 40) configured to together close said outlet opening (29, 39) of the casing in said second closed position.

13. An electric machine according to claim 1, including shutters which are interconnected by a member (44), such as a rod, and said temperature dependent member (41) is configured to cause this interconnecting member to transfer all of these shutters into said second position upon an increase of the temperature of the air flow through said outlet opening above said predetermined level.

14. A driving arrangement for a track-bound vehicle, comprising an electric machine according to claim 1.

15. A method for generating a traction force of a track-bound vehicle (10), comprising using an electric machine according to claim 1.

16. A track-bound vehicle having a driving arrangement for generating a traction force of the vehicle including at least one electric machine according to claim 1.

17. A track-bound vehicle according to claim 16, wherein said at least one electric machine is secured to a chassis of the vehicle (10), or secured to the bogie of the vehicle, or mounted on the axle, or a combination thereof, with said outlet opening (19, 29, 39) of the casing directed downward to be directed towards a rail track when the vehicle is standing on the rail track.

18. An electric machine according to claim 1, wherein said second closed position closes said outlet opening (19, 29, 39) of the casing by at least 80%.

19. An electric machine according to claim 18, wherein said second closed position closes said outlet opening (19, 29, 39) of the casing by at least 90%.

20. An electric machine according to claim 2, wherein said temperature dependent member (21, 31, 41) is configured to irreversibly transfer said at least one shutter to said second closed position upon an increase of the temperature of the air flow through said outlet opening (19, 29, 39) above said predetermined level.

* * * * *